United States Patent [19]
Lee

[11] Patent Number: 5,940,242
[45] Date of Patent: Aug. 17, 1999

[54] METHOD FOR DETERMINING A POSITION OF TRACK-ZERO AND MAPPING TRACKS ACCORDING THERETO

[75] Inventor: Jae-Sung Lee, Seoul, Rep. of Korea

[73] Assignee: Samsung Electronics Co., Ltd., Suwon, Rep. of Korea

[21] Appl. No.: 08/661,491

[22] Filed: Jun. 11, 1996

[51] Int. Cl.⁶ ................................................. G11B 5/596
[52] U.S. Cl. ................................. 360/78.08; 360/78.14
[58] Field of Search ........................... 360/78.08, 78.14, 360/77.02, 77.04, 77.05, 78.04, 78.09

[56] References Cited

U.S. PATENT DOCUMENTS

| | | | |
|---|---|---|---|
| 4,685,007 | 8/1987 | Nazarian et al. | 360/78 |
| 4,884,152 | 11/1989 | Ide | 360/78.14 |
| 5,552,945 | 9/1996 | Miura et al. | 360/78.08 |

*Primary Examiner*—Tan Dinh
*Attorney, Agent, or Firm*—Jones, Volentine, Steinberg & Whitt, L.L.P.

[57] ABSTRACT

A method for determining a position of track-0 and mapping tracks according thereto is disclosed. In a method for mapping tracks of a disk drive apparatus which uses a multi-platter system and stores track-0 information in a maintenance region, a head on a platter including track-0 is switched to sequentially search tracks along the surface of the platter from the track-0. When the head is positioned at an outer track or an inner track during track search, the head is switched to sequentially search tracks of the selected platter, and the track search for all the platters of multiple platters is repeated.

4 Claims, 6 Drawing Sheets

METHOD FOR DETERMINING A POSITION OF TRACK-ZERO AND MAPPING TRACKS ACCORDING THERETO

CROSS REFERENCE TO RELATED APPLICATIONS

The subject matter of the present application is related to that in co-pending applications Ser. Nos. 08/653,968, entitled "Method for Detecting Data Stroke for Disk Drive", filed May 28, 1996; 08/656,878, entitled "System and Method for Controlling Spindle Motor for Hard Disk Drive Unit", filed May 30, 1996; 08/658,099, entitled "Method for Generating Index Pulse with Index Pattern", filed Jun. 4, 1996; 08/657,665, entitled "Servo Information Recording Method for a Magnetic Recording Medium", filed May 31, 1996; 08/659,737, entitled "Data Sector Pulse Generating Method", filed Jun. 6, 1996; 08/661,492, entitled "Servo Sector Forming Method for Fast Detection and Track Address Correcting Method", filed Jun. 11, 1996; and 08/676,962, entitled "Sealing Device of Hard Disk Drive", filed Jul. 8, 1996, incorporated herein by reference.

FIELD OF THE INVENTION

The present invention relates to track mapping of a hard disk drive, and more particularly to a track-zero position determining method for track mapping and a track mapping method for performance improvement.

BACKGROUND OF THE INVENTION

A hard disk drive magnetically writes and reads data to and from a rotating disk. Hard disk drives are widely used as an auxiliary storage device for a computer system as they can access mass data at a high speed. Access to a hard disk drive can be characterized as a physical mode and a logical mode. The physical mode is utilized when manufacturing the drive in a factory and used to find out a physical error or a defect position during a drive test by sequentially numbering tracks of the drive from an outer diameter to an inner diameter.

The logical mode (hereinafter, referred to as the user mode) is used when the user of a host computer accesses the drive and is used by sequentially numbering the tracks from the outermost track to the innermost track, like the typical physical mode. However, the user mode may be used by selecting an appropriate value according to the capacity of the drive, irrespective of the number of physical heads or the number of tracks. In both the physical mode and the user mode, when sequentially searching the tracks of the drive, the heads are sequentially switched within the same track (i.e., within one cylinder) and then the tracks are searched generally.

A process for sequentially searching and mapping the tracks in the user mode will now be described with reference to FIGS. 1 to 3. FIG. 1 is a block diagram of a general hard disk drive. In the drawing, the hard disk drive of a multi-platter system including two disks 2 and four heads 4 is illustrated. In the hard disk drive using the multiplatter system, disks 2, of a stack form generally, are installed at one spindle motor 30, and each of both surfaces of each disk corresponds to one head. The spindle motor 30 rotates a hub 6 around which the disks 2 are attached.

Head 4 is positioned on the surface of disk 2 and installed at a vertically extended arm 8 of an arm assembly of a rotary voice motor (VCM) 24. Pre-amplifier 12 pre-amplifies a signal picked up by one of heads 4 when data is read, and supplies an analog read signal to a read/write channel circuit 14. When data is written, pre-amplifier 12 drives one of heads 4 so as to write encoded write data supplied from read/write channel circuit 14 on disk 2. In such case, pre-amplifier 12 selects one of heads 4 by the control of a disk data controller (DDC) 32 controlled by a microcontroller 18.

Read/write channel circuit 14 generates read data RDATA by detecting and decoding a data pulse from the read signal received from pre-amplifier 12, and decodes write data WDATA received from disk data controller 32 to be supplied to pre-amplifier 12. Moreover, read/write channel circuit 14 generates a position error signal (PES) by demodulating head position information which is one of servo information written in the disk.

The position error signal PES, generated from read/write channel circuit 14, may be supplied to analog-to-digital (A/D) converter 16. A/D converter 16 converts the position error signal PES to a digital level value corresponding to its level and supplies the digital level value to the microcontroller 18. The DDC 32, controlled by the microcontroller 18, writes data received from host computer on disk 2 through read/write channel circuit 14 and pre-amplifier 12, or reads data from disk 2 to be supplied to the host computer.

DDC 32 also interfaces communication between the host computer and microcontroller 18. Microcontroller 18 controls the DDC 32 in response to a read or write command received from the host computer and controls track search and track follow-up. In this case, microcontroller 18 uses the position error signal PES supplied from A/D converter 16 to control track follow-up. Microcontroller 18 includes a ROM (Read Only Memory) having a control program of the hard disk drive and a flash memory for storing track-0 information.

Digital-to-analog (D/A) converter 20 converts a position control value of heads 4 to an analog signal A VCM driver 22 supplies, to VCM 24, a driving current I(t) for driving an actuator by a signal received from D/A converter 20. VCM 24 shifts heads 4 within the disk in response to the direction and level of the driving current received from VCM driver 22. Motor controller 26 controls spindle motor driver 28 according to a rotating control value of disks 2 generated from microcontroller 18. Spindle motor driver 28 rotates disks 2 by driving spindle motor 30 by control of motor controller 26. The spindle motor 30 rotates the hub 6 and so rotates the disks 2 that are attached to the hub 6.

FIG. 2 is a front view of a head disk assembly (HDA) illustrating a track mapping process of the hard disk drive using the multiplatter system. Each of heads H0 to H3 is fixed to gimbals of an end of a suspension of swing arm 8 and moves horizontally on disk 2 with the center axis of a pivot bearing (not shown).

FIG. 3 is a diagram illustrating a direction of the track mapping process FIG. 2. In FIGS. 2 and 3, it is assumed that platters corresponding to respective heads H0, H1, H2 and H4 are defined as A, B, C and D, and there are n+1(0~n) tracks on each platter. Referring to FIGS. 2 and 3, when sequentially searching tracks in the user mode, heads H0, H1, H2 and H3 are moved to the outermost track of the physical track.

Thereafter, all tracks within the same cylinder are searched by sequentially performing head switching. Finally, the next cylinder of the mapping completed cylinder is searched. That is, track mapping is done up to the innermost track. Consequently, the track mapping is implemented in the order of head H0, track A0→head H1, track B0→head H2, track C0→head H3, track D0→head H0, track A1→head H1, track B1→. . . . .→head H1, track Bn→head H2, track Cn→head H3, track Dn. The direction of the track mapping can be briefly expressed as illustrated in FIG. 3. In FIG. 3, a reference symbol CY designates a cylinder.

Generally, in a hard disk drive, time for searching one track is shorter than head switching time. The reason is that since a recording density of TPI (track per inch) of disk 2, that is, of a disk radius direction is very high, the alignment of the head may cause, during servo writing, some transformation by the assembly of a cover or a printed circuit board (PCB). Furthermore, in the typical hard disk drive, since force is applied to the swing arm caused by a push rod during servo writing, alignment of the head may be changed.

Therefore, when carrying out the above-described track mapping for total disk surfaces of a drive, track mapping time is delayed by head switching time, thereby deteriorating the performance of the drive. Further, if the above-described track mapping process is implemented, since a file allocation table (FAT), a route directory, a master boot record, and the like, having position information of a file in a DOS™ or Windows® environment are generally positioned at a user track-0, the tracks from an outer diameter region to an inner diameter region should be searched in the worst case.

SUMMARY OF THE INVENTION

It is an object of the present invention to provide a track mapping method which is capable of improving the performance of a hard disk drive by reducing track mapping time.

It is another object of the present invention to provide a track-0 position determining method which is capable of reducing track mapping time of a hard disk drive.

According to one feature of the present invention, a method for determining a position of track-0 for a track mapping of a disk driving write apparatus using a disk as a write medium includes the steps of: determining a data region by detecting an outer track and an inner track; dividing the disk into a plurality of zone regions by measuring the head/disk combination performance; and setting an innermost track of a specific zone region out of the plurality of zone regions to track-0 to store track-0 information in a maintenance region of the disk.

According to another feature of the present invention, a method for mapping tracks of a disk driving write apparatus which uses a multiplatter system and stores track-0 information in a maintenance region includes the steps of: switching a head on a platter including track-0 to sequentially search tracks along the surface of the platter from track-0; and when the head is positioned at an outer track or an inner track during track search, switching the head to sequentially search tracks of the selected platter, and repeating the track search for all the platters of multiple platters.

BRIEF DESCRIPTIONS OF THE DRAWINGS

DETAILED DESCRIPTION OF THE INVENTION

In the following description and the accompanying drawings, numerous specific details such as the number of tracks, a position of track-0, a processing flow, and the like, are set forth to provide a more thorough understanding of the present invention. It will be obvious to one of ordinary skill in the art that the present invention may be practiced without these specific details. Detailed description for known functions and structures are omitted so as not to obscure the present invention.

Figure 1:
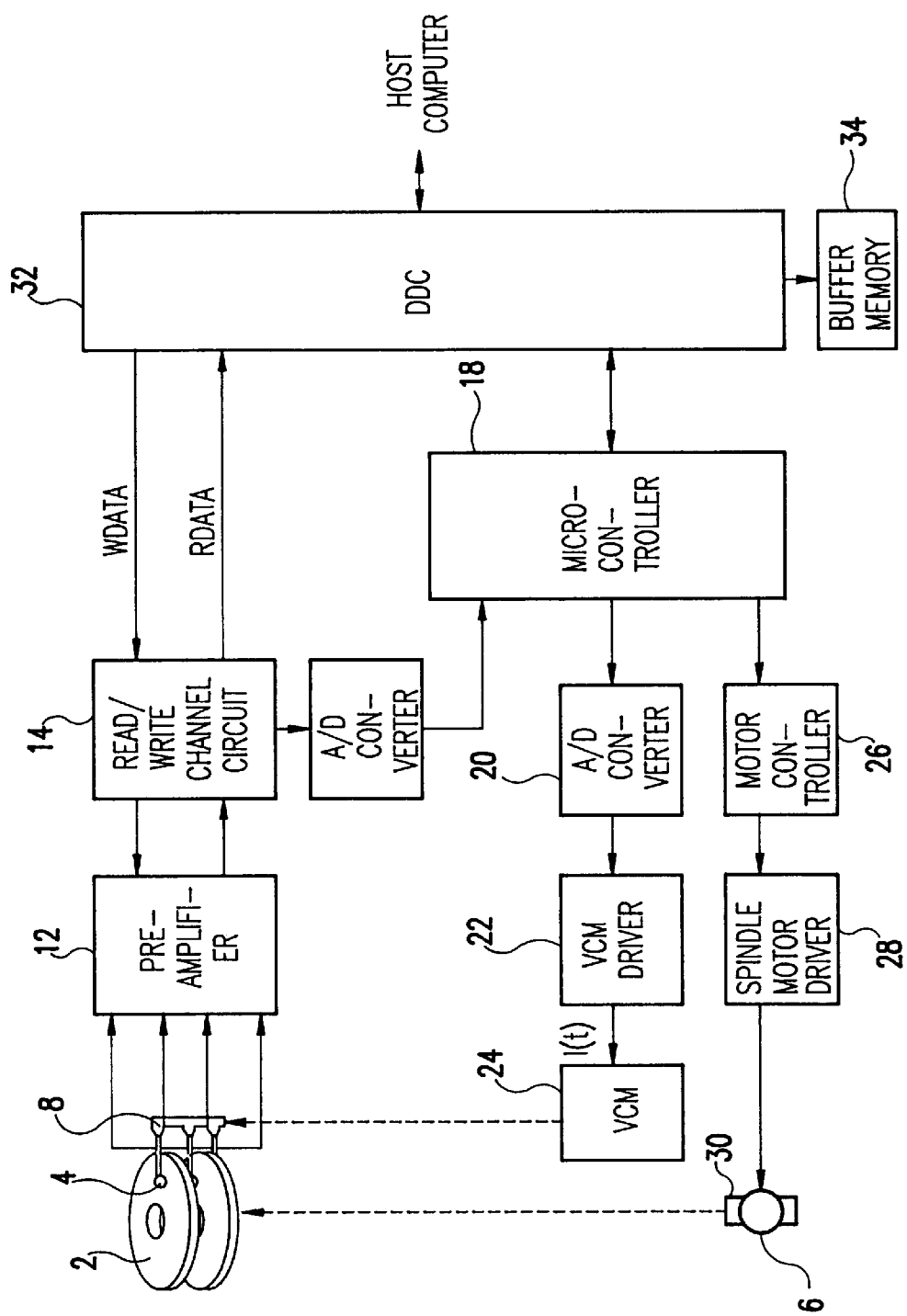
FIG. 1 is a block diagram of a typical hard disk drive.
Figure 2:
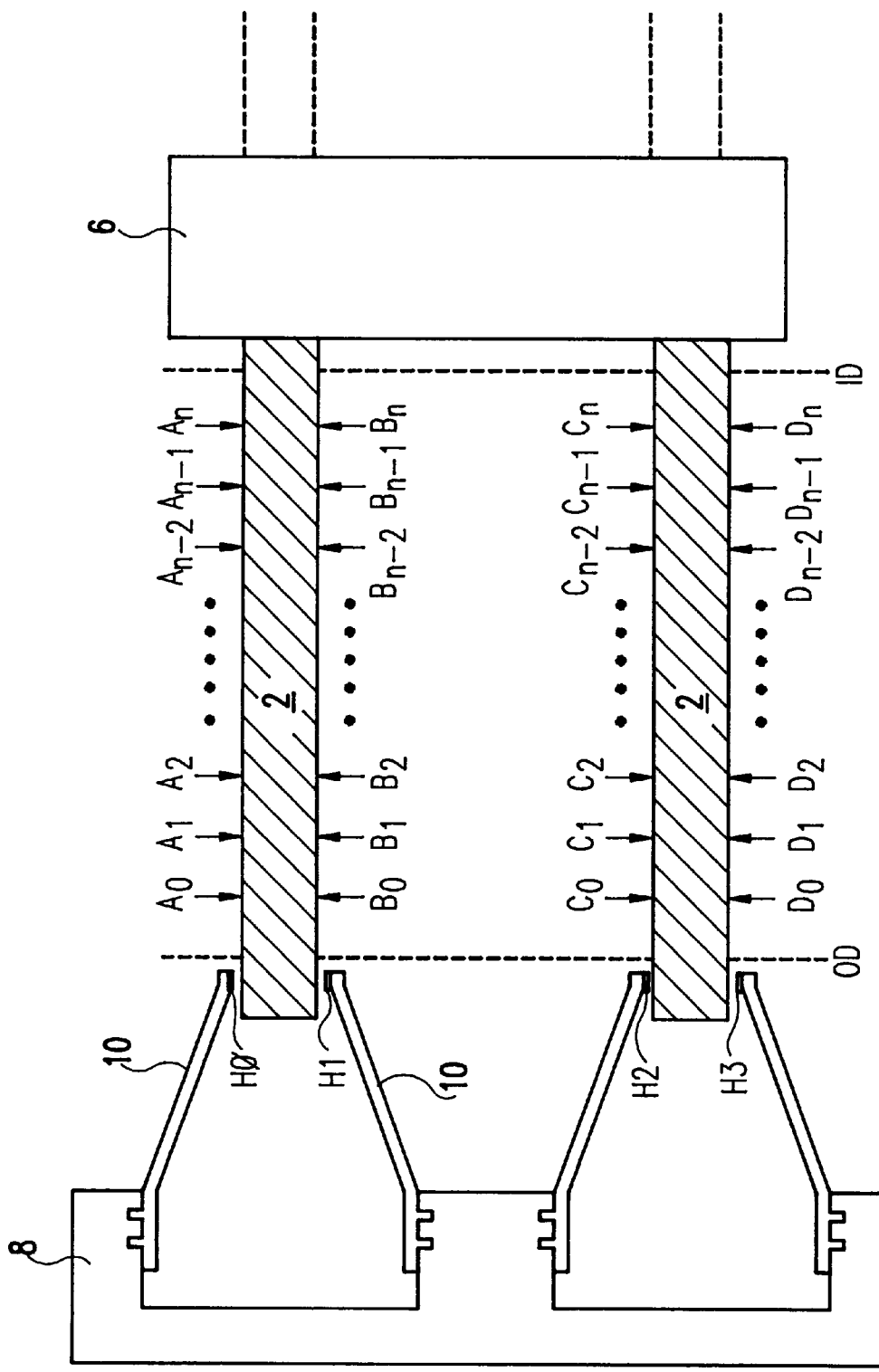
FIG. 2 is a front view of a head disk assembly illustrating a track mapping process of the hard disk drive of FIG. 1.
Figure 3:
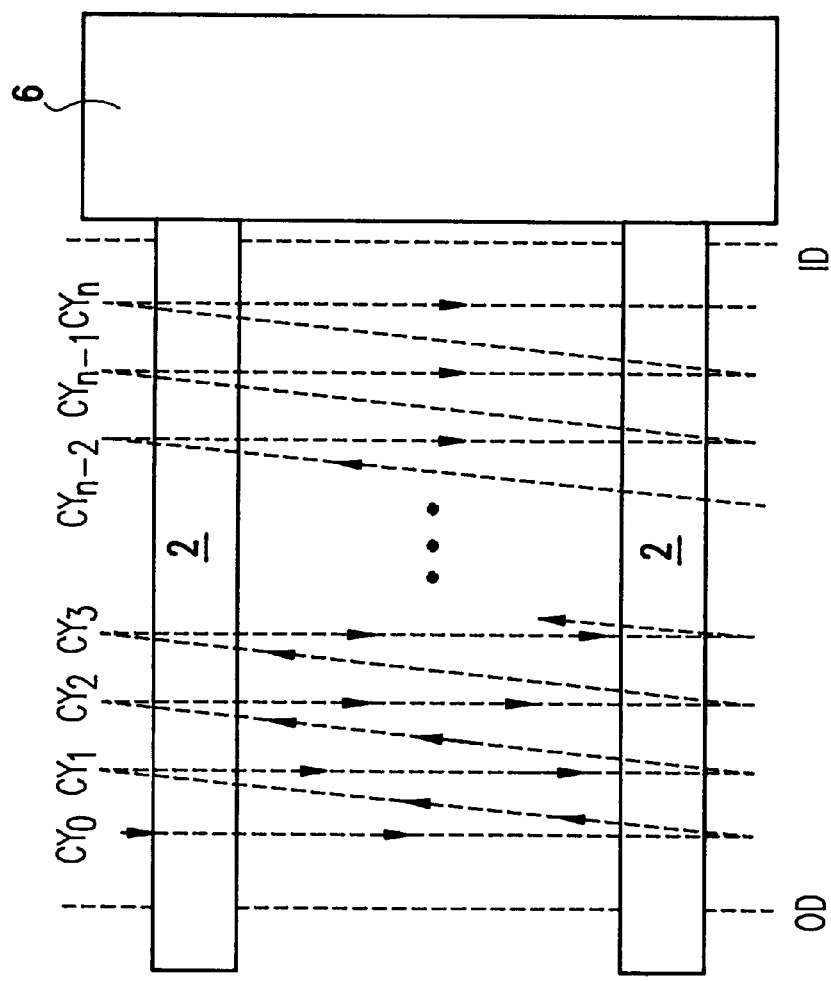
FIG. 3 is an exemplary diagram illustrating a direction of the track mapping process of FIG. 2.
Figure 4:
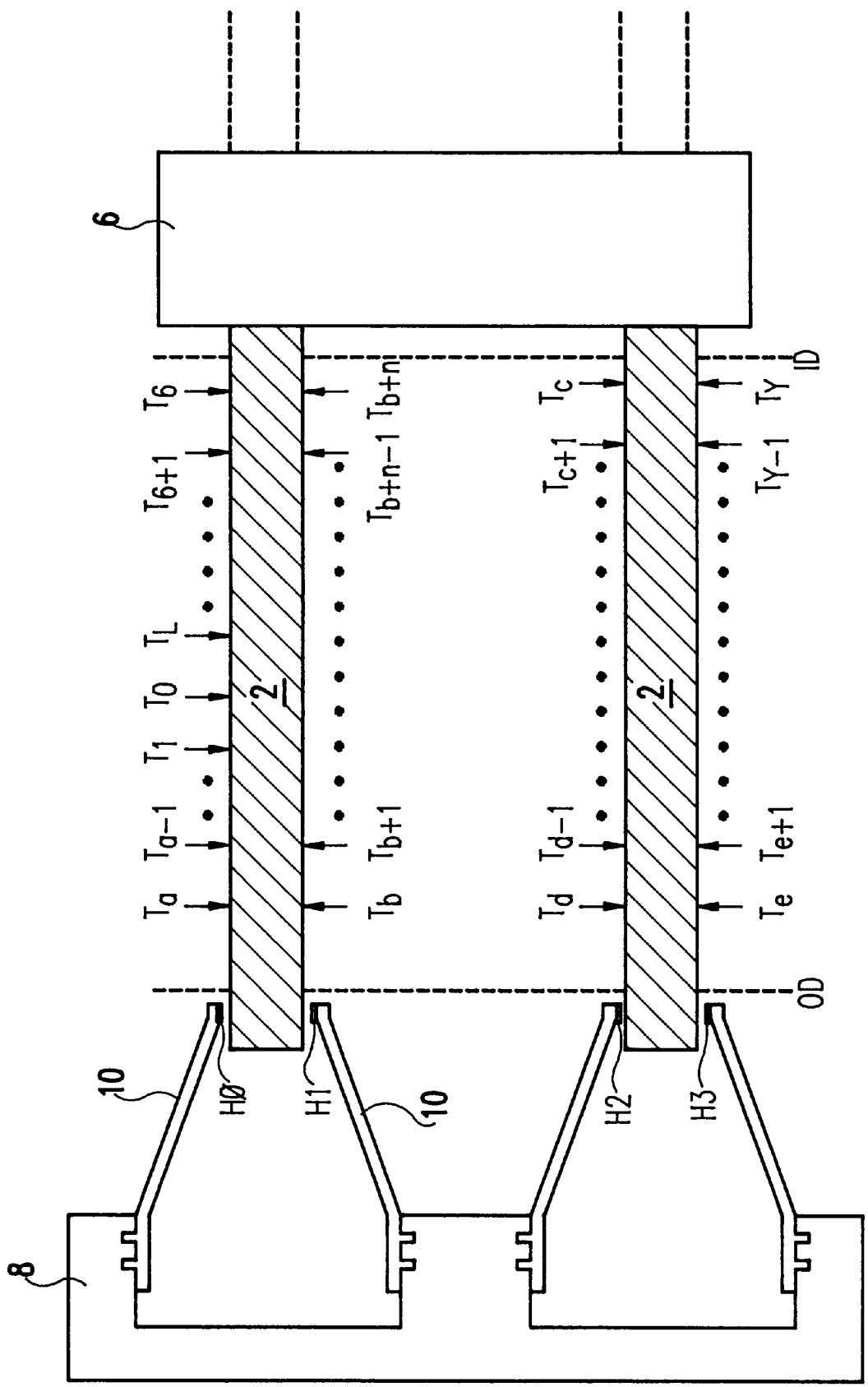
FIG. 4 is a front view of a head disk assembly illustrating a track mapping process according to the present invention.
Figure 5:
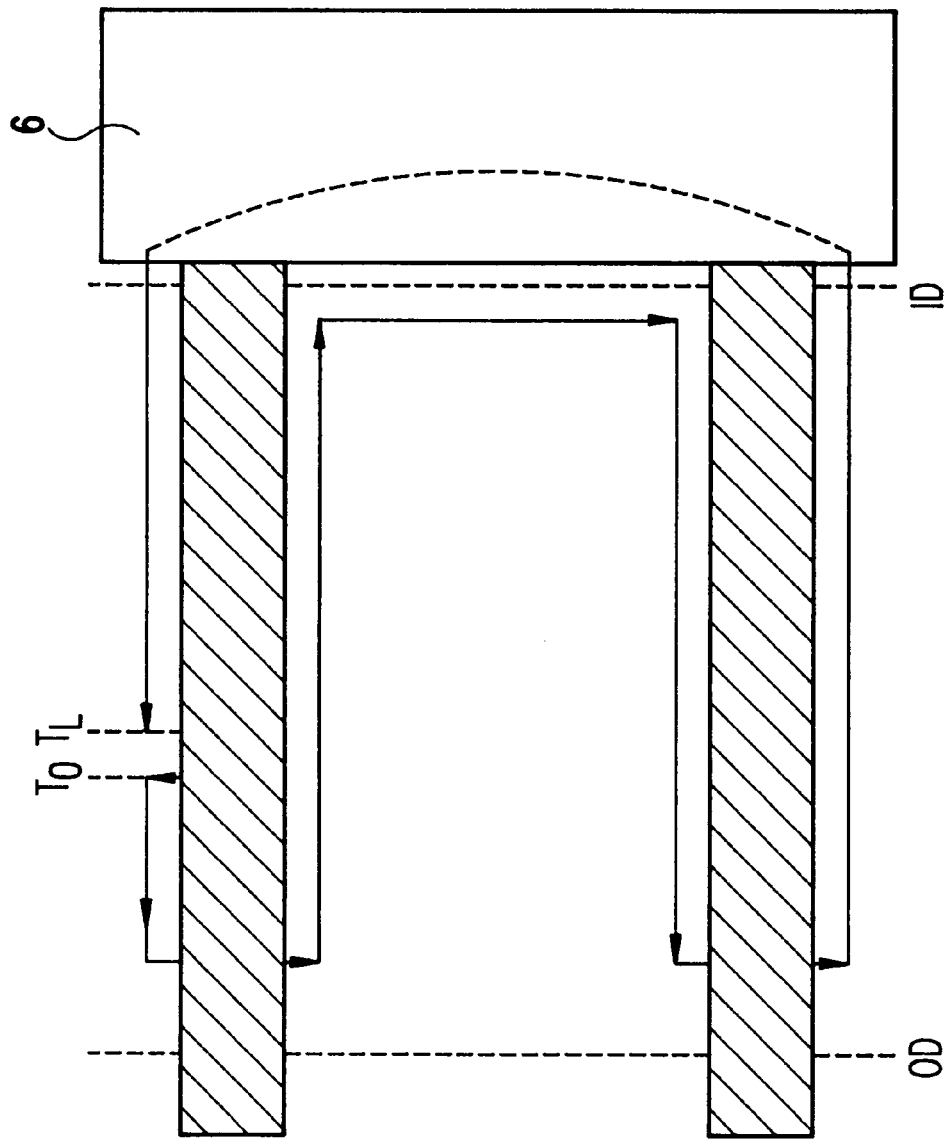
FIG. 5 is an exemplary diagram illustrating a direction of the track mapping process of FIG. 4.
Figure 6:
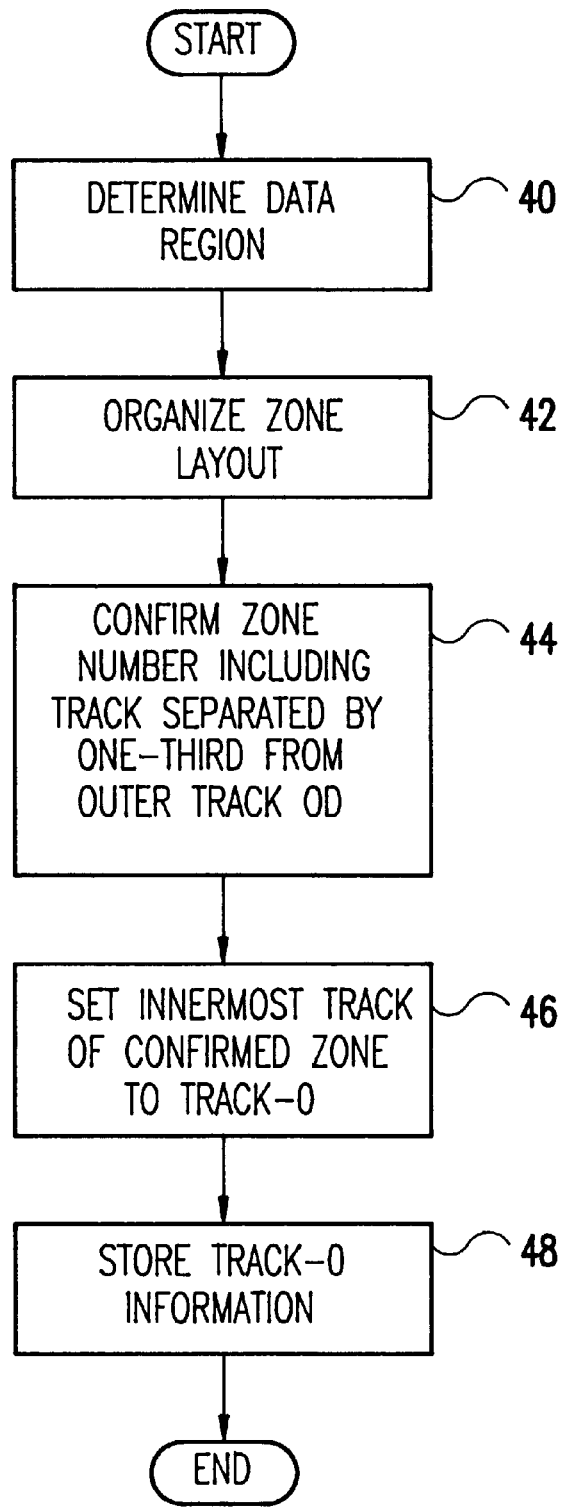
FIG. 6 is a flow chart illustrating a track-0 position determining process according to the present invention.

FIG. 4 is a front view of a head disk assembly (HDA) illustrating a track mapping process according to the present invention. FIG. 5 illustrates a track mapping direction of FIG. 4. FIG. 6 illustrates a track-0 position determining process according to the present invention.

Referring to FIG. 6, microcontroller 18 determines, at step 40, a maximum data stroke region, that is, a data region by detecting an outer diameter (OD) and an inner diameter (ID) of a track. At step 42, microcontroller 18 organizes an optimal zone layout for the entire drive by measuring the head/disk combination performance of an error rate and the like.

Microcontroller 18 confirms, at step 44, a zone number including a track separated by one-third from the outer track OD out of the entire data stroke region. Microcontroller 18 sets, at step 46, the innermost track of the confirmed zone number to track-0. At step 48, microcontroller 18 stores track-0 information in a maintenance region, a flash memory or a programmable ROM of the disk 12, and a series of track position determining courses are completed.

If a position of track-0 is determined using the above-mentioned technique, track-0 can be set to a physically different position for each drive. Hereinafter, it is assumed that track-0 set through the above track-0 position determining process is defined as $T_0$ and $T_0$ exists on a disk platter corresponding to a head H0. The track mapping process will now be described with reference to FIGS. 4 and 5.

Referring to FIG. 4, the HDA of the hard disk drive includes four heads H0, H1, H2 and H3 corresponding to two disks 2 and each disk platter. In the disk platter corresponding to the head H0, track-0 $T_0$ set through the above track-0 position determining process is positioned at a point separated by one-third of the entire data stroke region from the OD region. If a track mapping execution command is received from an external device such as the host computer, microcontroller 18 carries out the track mapping process as follows.

Microcontroller 18 sequentially searches tracks (that is, $T_{a-1}$ and $T_a$) of the OD region from track-0 $T_0$ without head switching. The track $T_a$ is checked to see if it has been searched. If the track $T_a$ has been searched, the head is switched to head H1.

Thereafter, tracks ($T_b$, $T_{b+1}$, . . . , $T_{b+n}$) from the OD region to the ID region on the disk platter corresponding to the head H1 are sequentially searched. Whether track $T_{b+n}$ has been searched is checked. If track $T_{b+n}$ has been searched, the head is switched to head H2. Thereafter, tracks from the ID region to the OD region on the disk platter corresponding to the head H2 are sequentially searched.

Therefore, a check is made to see if track $T_d$ has been searched. If track $T_d$ has been searched, the head is switched to head H3. Then tracks from the OD region to the ID region on the disk platter corresponding to head H3 are sequentially searched. Finally, track $T_f$ is checked to see if it has been searched. If track $T_f$ has been searched, the head is switched to head H0.

Tracks from the ID region to the OD region on the disk platter corresponding to the head Ho are sequentially searched. During search, microcontroller 18 searches the tracks up to the rear of track-0 $T_0$. The track at the rear of track-0 $T_0$ is the last track $T_L$ of the track mapping.

Track mapping direction is illustrated in FIG. 5. Head switching is implemented only at the OD region and the ID region of each disk platter. Hence, the inventive track mapping method implements the track search along the surface of the disk platter and carries out the head switching only at the OD region and the ID region, thereby minimizing a delay time caused by head switching.

As noted above, since the head switching operation is minimized during the track mapping of the hard disk drive, the time delayed by the head switching operation is reduced, and the performance of the drive can be improved. Since the position of track-0 is set to a physically different position for each drive, the drive having the optimal performance in a DOS or window environment can be designed.

Therefore, it should be understood that the present invention is not limited to the particular embodiment disclosed herein as the best mode contemplated for carrying out the present invention, but rather that the present invention is not limited to the specific embodiments described in this specification except as defined in the appended claims.

What is claimed is:

1. A method for determining a position of a track-zero region for track mapping of a disk drive using a disk as a write medium, said method comprising the steps of:

determining a data region of the disk by detecting an outer region and an inner region of the disk and locating the data region between the inner and outer regions;

dividing the data region into a plurality of zone regions sequentially located from an area proximate to the inner region to an area proximate to the outer region, the zone regions functioning to hold data throughout substantially the entire circumferential distance of the disk;

setting only one of the plurality of zone regions as a track-zero region; and storing track-zero information in a maintenance region of the disk, wherein the track-zero region is separated by at least one of the plurality of zone regions from the inner region, and is separated by at least one of the plurality of zone regions from the outer region.

2. A method for determining a position of a track-zero region for track mapping of a disk drive using a disk as a write medium, said method comprising the steps of:

determining a data region of the disk by detecting an outer track and an inner track of the disk and locating the data region between the inner and outer tracks;

dividing the data region into a plurality of zone regions sequentially located from an area proximate to the inner track to an area proximate to the outer track;

setting only one of the plurality of zone regions that is not adjacent to either the inner track or the outer track as a track-zero region; and storing track-zero information in a maintenance region of the disk, wherein the track-zero region is separated from the outer track by one-third of the length of the data region.

3. A method for determining a position of a track-zero region, as recited in claim 1, wherein the maintenance region is a flash memory.

4. A method for determining a position of a track-zero region, as recited in claim 1, wherein the maintenance region is a programmable ROM.

* * * * *